(12) United States Patent
Sankrithi (10) Patent No.: US 10,752,329 B2
(45) Date of Patent: Aug. 25, 2020

(54) AIRCRAFT FUSELAGE FRAME EQUIPPED WITH AIRBAG AND RISER DUCT CLOSURE COVER

(71) Applicant: The Boeing Company, Chicago, IL (US)

(72) Inventor: Mithra Sankrithi, Seattle, WA (US)

(73) Assignee: The Boeing Company, Chicago, IL (US)

(*) Notice: Subject to any disclaimer, the term of this patent is extended or adjusted under 35 U.S.C. 154(b) by 667 days.

(21) Appl. No.: 15/632,966

(22) Filed: Jun. 26, 2017

(65) Prior Publication Data

US 2018/0370610 A1     Dec. 27, 2018

(51) Int. Cl.
| | |
|---|---|
| *B64D 13/06* | (2006.01) |
| *B64C 1/06* | (2006.01) |
| *B64D 11/06* | (2006.01) |

(52) U.S. Cl.
CPC .............. *B64C 1/061* (2013.01); *B64D 11/06* (2013.01); *B64D 13/06* (2013.01); *B64D 2201/00* (2013.01)

(58) Field of Classification Search
CPC ......... B64C 1/061; B64D 11/06; B64D 13/06; B64D 2013/0603; B64D 2013/0625
See application file for complete search history.

(56) References Cited

U.S. PATENT DOCUMENTS

| | | | |
|---|---|---|---|
| 5,547,149 A | 8/1996 | Kalberer et al. | |
| 5,558,300 A | 9/1996 | Kalberer et al. | |
| 5,897,079 A * | 4/1999 | Specht | B64C 1/067 244/118.5 |
| 6,491,254 B1 * | 12/2002 | Walkinshaw | A62C 3/08 244/118.5 |
| 7,717,372 B2 | 5/2010 | Sankrithi et al. | |
| 8,540,275 B2 | 9/2013 | Kokeguchi | |
| 2012/0015595 A1 | 1/2012 | Sabadie et al. | |
| 2012/0074258 A1 | 3/2012 | Papke et al. | |

(Continued)

OTHER PUBLICATIONS

Garcia, Marisa, Why airbags are being used in aircraft seats, Runway Girl Network, https://runwaygirlnetwork.com/2014/01/27/why-airbags-are-being-used-in-aircraft-seat/, printed on Apr. 6, 2017.

(Continued)

*Primary Examiner* — Justin M Benedik
(74) *Attorney, Agent, or Firm* — Ostrager Chong Flaherty & Broitman P.C.

(57) ABSTRACT

Fuselage configurations in which window seats project into and partially occupy inter-frame spaces. In accordance with some embodiments, a frame in proximity to a window seat is equipped with a riser duct closure cover for defining a riser duct for passing a volume of air through a supply duct located below a floor of a passenger cabin through the riser duct and through a crown distribution duct located above a ceiling of the passenger cabin. In accordance with other embodiments, the frames in proximity to window seats are equipped with respective airbags. More specifically, for each pair of adjacent frames in which the forward frame of the pair is located forward of the window seat, the aft frame of the pair is located aft of the window seat, the forward frame is equipped with an airbag.

20 Claims, 9 Drawing Sheets

(56) References Cited

U.S. PATENT DOCUMENTS

2012/0248244 A1\* 10/2012 Brownjohn ............. B64C 1/061
　　　　　　　　　　　　　　　　　　　　　　　244/118.5
2016/0031562 A1\* 2/2016 Mores .................... B64C 27/04
　　　　　　　　　　　　　　　　　　　　　　　244/119

OTHER PUBLICATIONS

Airlines.Net, Airbags Airbags In Light Aircraft?, http://www.airliners.net/forum/viewtopic.php?t=772127, printed on May 23, 2017.

Sullivan, Bob et al., NBC NEWS, Why don't planes have safer seat belts? Cost and Comfort, http://www.nbcnews.com/technology/why-dont-planes-have-safer-seat-belts-cost-comfort-6C10584677, Jul. 10, 2013.

FSF Editorial Staff, Cabin Crew Safety, For everyone concerned with the safety of flight, inflatable restraints installed on some transport aircraft, flight safety foundation, Jul.-Aug. 2003, vol. 38, No. 4.

Supercub.org Discuss Forums, Thread: Need Help with potential air bag system for Super Cubs, Jul. 15, 2013, http://www.supercub.org/forum/showthread.php?45259-Need-help-with-potential-air-bag-system-for-Super-Cubs, printed on May 23, 2017.

\* cited by examiner

AIRCRAFT FUSELAGE FRAME EQUIPPED WITH AIRBAG AND RISER DUCT CLOSURE COVER

BACKGROUND

This disclosure generally relates to passenger aircraft that have passengers seated proximate to a fuselage sidewall and behind respective fuselage frames, and more particularly to fuselage frames configured to have additional functionalities.

A fuselage of a passenger aircraft is typically constructed with a fuselage skin structurally connected to a skeleton structure that includes a series of spaced-apart, hoop-shaped frames. The hoop-shaped frames define the aircraft cross section at locations along the longitudinal length of the fuselage. A passenger cabin (hereinafter "cabin") is formed inside the fuselage by supplying a deck (i.e., floor) and a ceiling, and covering the interior sides of the fuselage with decorative interior side panels. In some aircraft, in addition, a multiplicity of windows are formed through the interior side panels and fuselage skin, and located adjacent at least some of the window seats. Passenger aircraft also include an environmental control system (or ECS) that includes a distribution duct in a crown of the fuselage above the cabin ceiling, riser ducts extending from the distribution duct downward along the fuselage sidewall to a supply duct and/or an air conditioning pack (A/C pack) below the cabin deck to channel air from the supply duct and/or A/C pack to the distribution duct. The riser ducts are individual ducts positioned at locations along the longitudinal length of the fuselage and between the fuselage skin and the interior side panels (sometimes around the windows).

Fuselage configurations are known in which a multiplicity of frames are spaced apart along a longitudinal axis of the fuselage in accordance with a specified frame pitch, while the cabin contains a multiplicity of rows of seats separated according to a seat pitch. The seat pitch may be indexed to the frame pitch such that window seats are located between adjacent frames to permit a reduced-perimeter (i.e., reduced-width) aircraft fuselage. For example, in one known exemplary reduced-perimeter fuselage configuration, outboard portions of the window seats occupy respective portions of the spaces between adjacent frames (hereinafter "inter-frame spaces").

For aircraft having window seats that project at least partially into respective inter-frame spaces, there is reduced and often insufficient space between the fuselage skin and interior side panels to locate conventional ECS riser ducts, riser ducts used for wiring and other aircraft components that are usually positioned between the fuselage skin and the interior side panels. This window seat arrangement also puts the window seat passenger closer to the fuselage frame, raising some concern that such a seating arrangement would not satisfy Head Impact Criteria (HIC) for certification.

SUMMARY

One aspect of the subject matter disclosed in detail below is an aircraft having a multiplicity of frames spaced apart along a longitudinal axis of the fuselage with inter-frame spaces between adjacent frames of the multiplicity of frames, a deck that spans the interior volume of and is supported by the fuselage, a ceiling depending from the fuselage and disposed above the deck, and a riser duct closure cover attached to a portion of a frame of the multiplicity of frames to define a riser duct. In accordance with some embodiments, the aircraft also includes a supply duct located below the deck and a crown distribution duct located above the ceiling in fluid communication with the supply duct by way of the riser duct. The crown distribution duct is in fluid communication with the riser duct by way of a feed-out tube, and the supply duct is in fluid communication with the riser duct by way of a feed-in tube.

In accordance with one embodiment, the riser duct defined by the frame and the riser duct closure cover has a cross-sectional profile comprising at least one curved section to mitigate at least one of air friction and noise due to air flow through the riser duct. In accordance with another embodiment, the aircraft also includes means for reducing noise that cover at least a portion of a surface of the riser duct. The surface of the riser duct that is covered by the means for reducing noise faces inboard.

In accordance with some embodiments, the frame to which the riser duct closure cover is attached comprises first and second flanges and a web connected to the first and second flanges, and the riser duct closure cover is attached to the first and second flanges. In some cases, the frame has a cross-sectional profile that is channel-shaped and the riser duct closure cover has a cross-sectional profile that is planar. In other cases, the frame has a cross-sectional profile that is H-shaped and the riser duct closure cover has a cross-sectional profile that is planar.

In accordance with other embodiments, the frame to which the riser duct closure cover is attached comprises a flange and a web connected to the flange, and the riser duct closure cover is attached to the web and the flange. In some cases, the flange and web of the frame have a cross-sectional profile that is L-shaped and the riser duct closure cover has a cross-sectional profile that is L-shaped. In other cases, the frame has a cross-sectional profile that is T-shaped and the riser duct closure cover has a cross-sectional profile that is U-shaped.

In accordance with another aspect, the aircraft further comprises an airbag system having an airbag module mounted to a portion of the frame that the riser duct closure cover is attached to. The airbag module houses an airbag in a deflated state. In accordance with some embodiments, the airbag module includes a housing, a tear-away cover attached to the housing that covers the airbag in the deflated state housed inside the housing, and a decorative cover sheet that covers the tear-away cover.

A further aspect is a method for supplying air to a passenger cabin of an aircraft, comprising passing a volume of air through a riser duct defined by a portion of a frame of a fuselage of the aircraft and a riser duct closure cover. In accordance with some embodiments, the method further comprises passing the volume of air in sequence through a supply duct located below a floor of the passenger cabin, through the riser duct, and then through a crown distribution duct located above a ceiling of the passenger cabin.

Yet another aspect of the subject matter disclosed herein is a riser duct for use in an aircraft having a fuselage comprising a multiplicity of frames spaced apart along a longitudinal axis of the fuselage with inter-frame spaces between adjacent frames of the multiplicity of frames and a skin supported by the multiplicity of frames and bounding an interior volume of the fuselage; a deck that spans the interior volume of and is supported by the fuselage; and a ceiling depending from the fuselage and disposed above the deck. The riser duct comprises a riser duct closure cover attached to a portion of a frame of the multiplicity of frames from an elevation lower than the deck to an elevation higher than the ceiling to define the riser duct.

Other aspects of fuselage frames with added functionalities are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

The subject matter disclosed in detail below is directed to fuselage configurations and cabin layouts in which at least some window seats are situated such that they project into and partially occupy respective spaces (i.e., inter-frame spaces) between adjacent frames to enable a reduction in the perimeter of a fuselage and in which the lack of space for installation of ECS and other types of riser ducts, and the concern that such a seating arrangement would not satisfy HIC for certification, are addressed. It will be appreciated, however, that the subject matter disclosed herein can be used in any type of aircraft.

Not all features of an actual implementation are described in this specification. In the development of any such implementation, numerous implementation-specific decisions must be made to achieve the developer's specific goals, such as compliance with system-related and business-related constraints, which will vary from one implementation to another. Moreover, such a development effort might be complex and time-consuming, but would nevertheless be a routine undertaking for those of ordinary skill in the art having the benefit of this disclosure.

Figure 1:
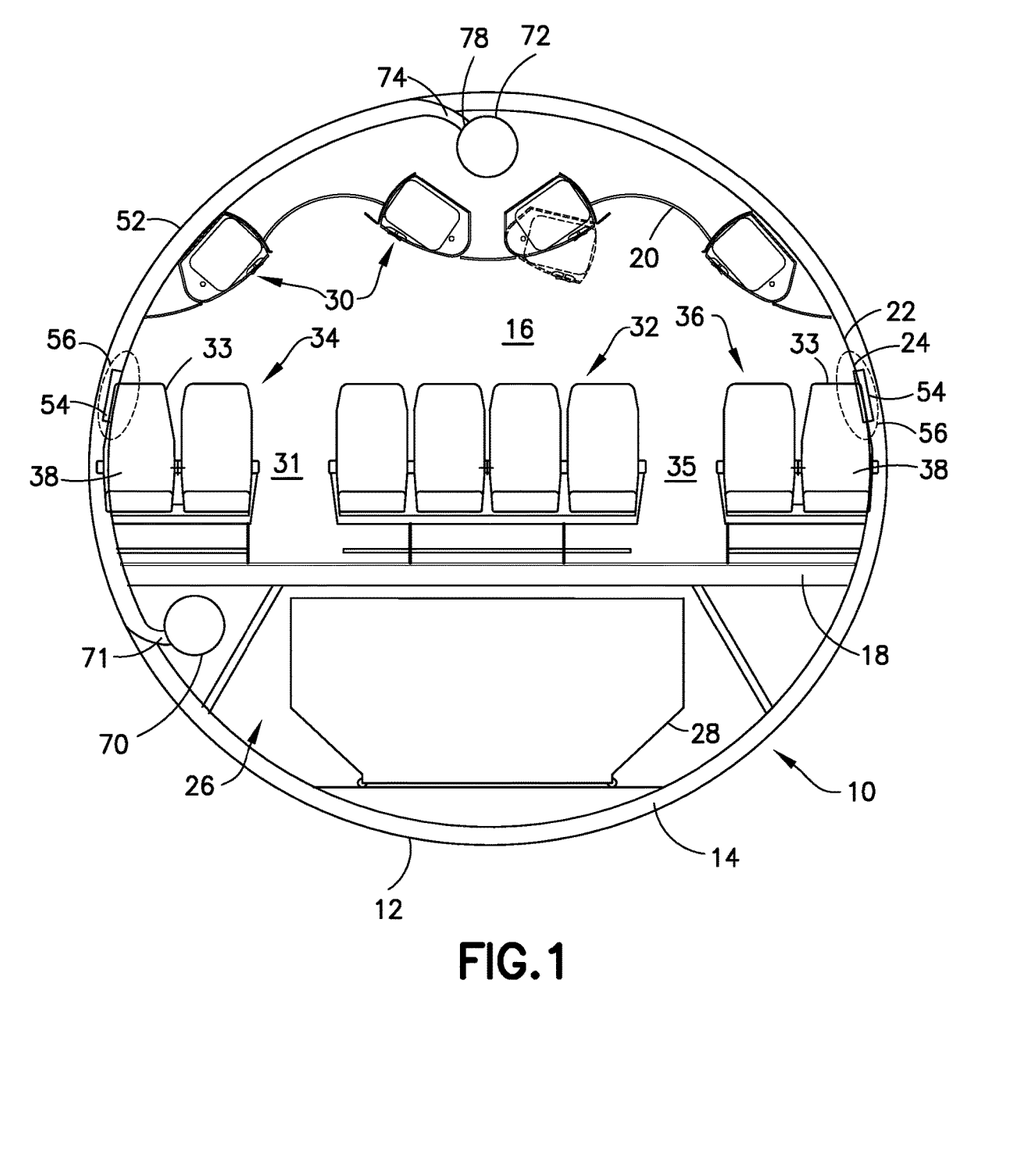
FIG. 1 is a diagram representing a sectional view of a fuselage in which some frames are equipped with riser duct closure covers for defining respective riser ducts and airbags mounted to frames located in proximity to and forward of respective window seats that project into respective inter-frame spaces.

FIG. 1 is a cross-sectional view of a fuselage 10, the cross-sectional view plane being perpendicular to a longitudinal axis of the fuselage 10. The fuselage 10 is constructed with a fuselage skin 12 structurally connected to and supported by a skeleton structure including a multiplicity of spaced-apart, hoop-shaped frames 14 (only one of which is visible in FIG. 1) that define an aircraft cross section at locations along the length of the fuselage 10 and have added functionality. Not all frames 14 in the fuselage 10 are identical; if the aircraft tapers from a central section to tail section, for example, then frames 14 near the center of the aircraft may be larger hoops and adjacent frames 14 will decrease in hoop size and the hoop shape of each of the frames 14 may also change, moving aft to the tail section. The frames 14 are joined by lightweight longitudinal stiffening elements called "stringers". The resulting assembly is covered with the fuselage skin 12 to produce the outer shell of the fuselage 10 that encloses an interior of the fuselage 10.

A cabin 16 is formed inside the fuselage 10 by supplying a deck 18, a ceiling 20, and decorative interior side panels 22 covering the sides 24 of the fuselage 10, such that the cabin 16 is bounded by the deck 18, the ceiling 20 and the interior side panels 22 installed on both sides 24 of the fuselage 2. The deck 18 (which forms the cabin floor) is attached to or integrally formed with opposing sides 24 of the fuselage 10, and separates the cabin 16 and a storage space 26 for holding baggage and/or cargo. For the purpose of illustration, FIG. 1 depicts a unit load device 28, which has been loaded into the storage space 26. For storing carry-on luggage, the cabin 16 is equipped with ceiling-mounted bins 30.

In accordance with the embodiment depicted in FIG. 1, the cabin 16 is provided with three seat modules separated by two aisles; however, the subject matter disclosed herein may be used with any seat configuration (i.e., single aisle or triple aisle seat configurations with any suitable number of seats on each side of an aisle). The right aisle 31 is flanked by center seat module 32 and right outboard seat module 34 (which appears on the left side of the fuselage 10 when viewed from a forward position, as shown), while the left aisle 35 is flanked by center seat module 32 and left outboard seat module 36. The right outboard seat module 34 and the left outboard seat module 36 each include a pair of seats 33, including a window seat 38 adjacent the interior side panels 22 of the fuselage 10 and a window 39 (shown in FIG. 2). Each window seat 38 has a portion that projects into an inter-frame space 40 formed by an adjacent concave interior side panel 42 (shown in FIG. 3).

At least some frames 14 in proximity to window seats 38 (or any other frames 14) are equipped with riser duct closure covers 50 (such as the closure covers 50A-50D shown in FIGS. 4A through 4I) for defining riser ducts 52 that replace conventional riser ducts and form a part of the aircraft environmental control system (ECS). The ECS of the aircraft includes an air distribution subsystem comprising: a supply duct 70 located below the deck 18; a feed-in tube 71 having one end connected to and in fluid communication with the supply duct 70; a riser duct 52 having one end connected to and in fluid communication with the other end of feed-in tube 71; a feed-out tube 74 having one end connected to and in fluid communication with the other end of the riser duct 52; and a crown distribution duct 72 located above the ceiling 20 and having an inlet 78 connected to and in fluid communication with the other end of feed-out tube 74. The riser duct 52 is partly defined by a portion of a fuselage frame 14. The crown distribution duct 72 is in flow communication with the supply duct 70 by way of the riser duct 52.

The riser duct closure covers 50 are not structural and can be formed from thermoset, thermoplastic, a thin plastic, or other suitable material. The riser duct closure covers 50 can be removed from the frames 14 during maintenance and/or overhaul.

Frames 14 in proximity to window seats 38 may additionally or alternatively be equipped with a pair of airbag modules 54, each proximal to a window seat 38 on opposing sides of the fuselage, discussed below in connection with FIGS. 6 to 7.

Figure 2:
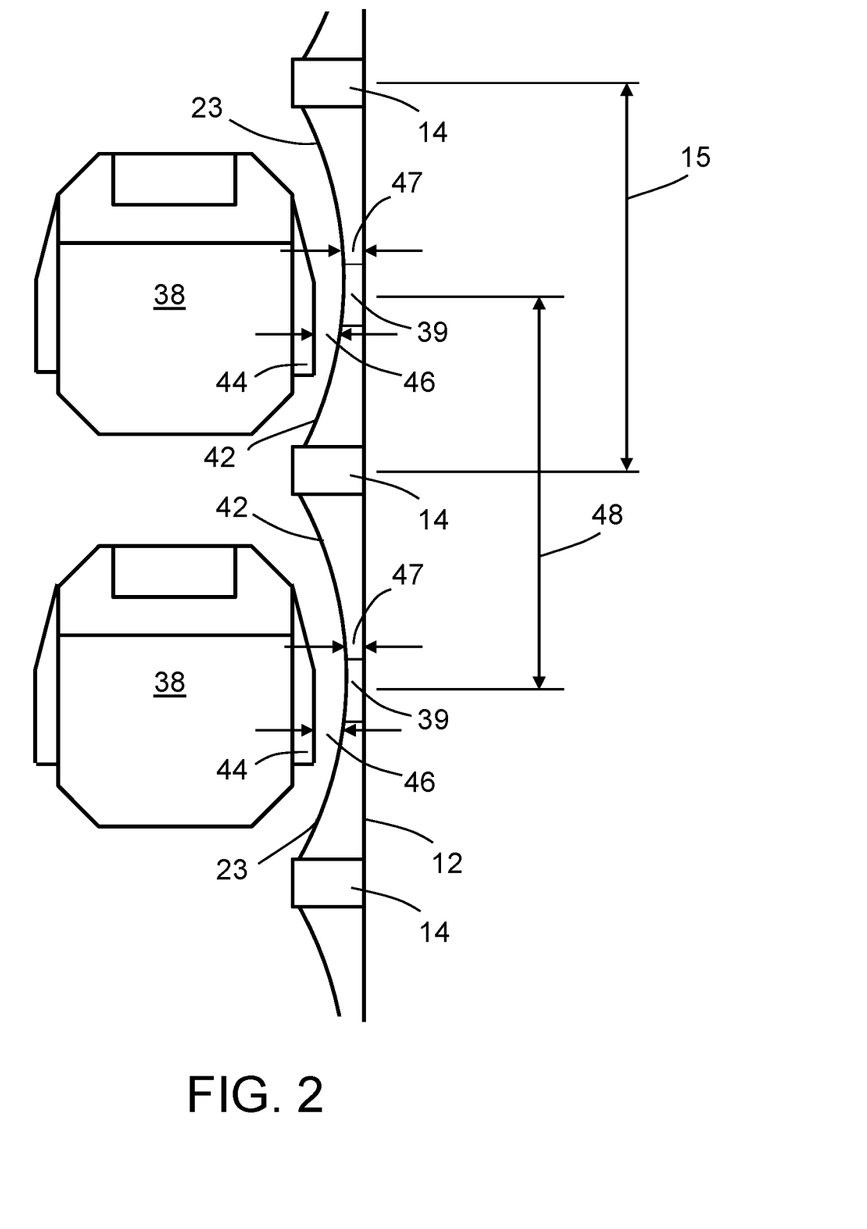
FIG. 2 is a diagram representing a top view of an outboard portion of a passenger cabin interior in which the window seats project into respective inter-frame spaces.

FIG. 2 is a top view of an outboard portion of such a cabin 16 where each window seat 38 has a portion that projects into an inter-frame space 40 formed by an adjacent concave interior side panel 42, and includes a pair of window seats 38, one located immediately behind the other and spaced apart by a seat pitch 48 (i.e., the longitudinal spacing between seats 33, rows of seats 33 or seat modules 32, 34, 36 arranged one behind the other in the aircraft cabin 16). Window seats 38 have outboard armrests 44 spaced a first clearance distance 46 (indicated by a pair of mutually opposing arrows) from the surface 23 of respective adjacent concave interior side panels 42. Frames 14 are separated by a frame pitch 15 (i.e., the longitudinal spacing between adjacent frames 14) so that window seats 38 are centered between adjacent frames 14. As a result, window seats 38 do not abut the frames 14 but are in the space between adjacent frames 14. Accordingly, the indexing of frame pitch 15 to seat pitch 48 presents an opportunity to reduce the fuselage width of the fuselage 10. Respective windows 39 may be inserted between successive frames 14, as shown in FIG. 2, at respective locations that are ergonomically appropriate for passengers seated in window seats 38. As used herein, the term "window pitch" means the longitudinal spacing between adjacent windows. Further, the term "inboard" means relatively closer to the longitudinal center plane of the fuselage 10, while the term "outboard" means relatively farther away from the longitudinal center plane of the fuselage 10.

Figure 3:
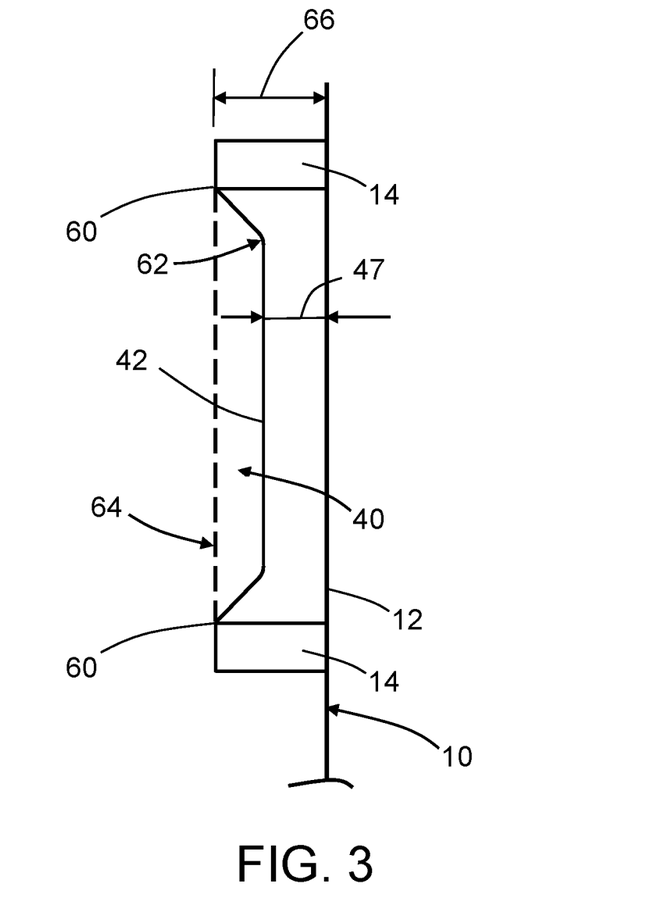
FIG. 3 is a diagram representing a top view of a portion of the outboard portion depicted in FIG. 2 and illustrating an inter-frame space in more detail.

FIG. 3 illustrates an example of a concave interior side panel 42 sculpted to reduce a second clearance distance 47 between the fuselage skin 12 and the surface 23 of the concave interior side panel 42 to a few inches. This sculpting applies to interior side panels 22 on either of the sides 24 of the fuselage 10. Further, other forms of sculpting may also be used. As seen in FIG. 3, the concave interior side panel 42 has points of attachment 60 to adjacent frames 14 and spans the frame pitch 15 (shown in FIG. 2) between the frames 14. The surface 23 of the concave interior side panel 42 curves sharply outboard, i.e., toward the fuselage skin 12, in curved region 62 to encroach into the inter-frame space 40 that is defined by the frames 14, the fuselage skin 12, and the dashed line 64 connecting inboard extremities of adjacent frames 14. The extent to which the frames 14 extend inboard is indicated by frame width 66 in FIG. 3. The extent of seat outboard encroachment into the inter-frame space 40 may vary but, in exemplary embodiments, the second clearance distance 47 between the surface 23 of the concave interior side panel 42 and the fuselage skin 12 is about 50% of the frame width 66. Other amounts of percentages of encroachment into the inter-frame space 40 are also useful and possible, taking into account space requirements for stringers, insulation and other components, and any regulations and other criteria that may apply. The larger the degree of such encroachment, the greater the potential for fuselage width and perimeter reduction. The amount of encroachment may be limited by other considerations.

The configuration of air distribution components shown in FIG. 1 enables a method for supplying air to a passenger cabin 16 of an aircraft. The method comprises passing a volume of air in sequence through a supply duct 70 located below a deck 18 (or floor) of the passenger cabin 16 through the riser duct 52, and then through a crown distribution duct 72 located above the ceiling 20, which riser duct 52 is defined by a portion of a frame 14 and a riser duct closure cover 50.

FIGS. 4A through 4I are diagrams representing respective cross-sectional views of respective frames 14 with respective attached riser duct closure covers 50 configured to define a riser duct 52 in accordance with various alternative embodiments. The cross-sectional plane in each drawing is perpendicular to the fuselage skin 12. The riser duct closure covers 50 are attached to the frames 14 and may also be attached to the fuselage skin 12 to define a riser duct 52 that extends from an elevation lower than the deck 18 to an elevation higher than the ceiling 20.

Figure 4A:
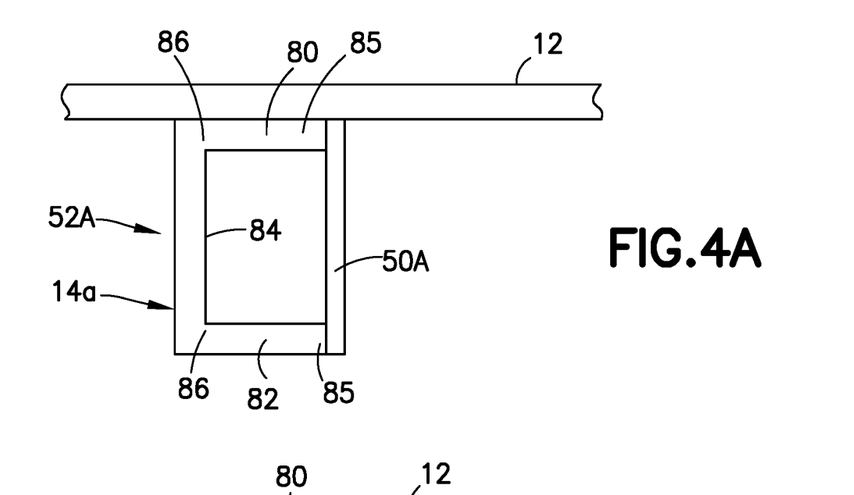
FIGS. 4A through 4I are diagrams representing respective sectional views of respective frames with respective attached riser duct closure covers configured to define an ECS riser duct in accordance with various alternative embodiments.

As seen in FIG. 4A, an open cross-sectional frame 14a has a cross-sectional profile comprising a first flange 80 attached to the fuselage skin 12, a second flange 82 extending parallel to the first flange 80, and a web 84 extending perpendicular to and connecting proximal ends 86 of the first flange 80 and second flange 82. The open cross-sectional frame 14a is closed by a riser duct closure cover 50A attached to the respective distal ends 85 of the first flange 80 and second flange 82, thus forming a riser duct 52A. If the fuselage skin 12 was a perfect circular cylinder (which it is not), the web 84 and the riser duct closure cover 50A can have a shape of a section of an annular ring and the first flange 80 and second flange 82 can be concentric with each other. In accordance with one embodiment, the frame 14a has a cross-sectional profile that is channel-shaped as shown and the riser duct closure cover 50A has a cross-sectional profile that is planar.

Figure 4B:
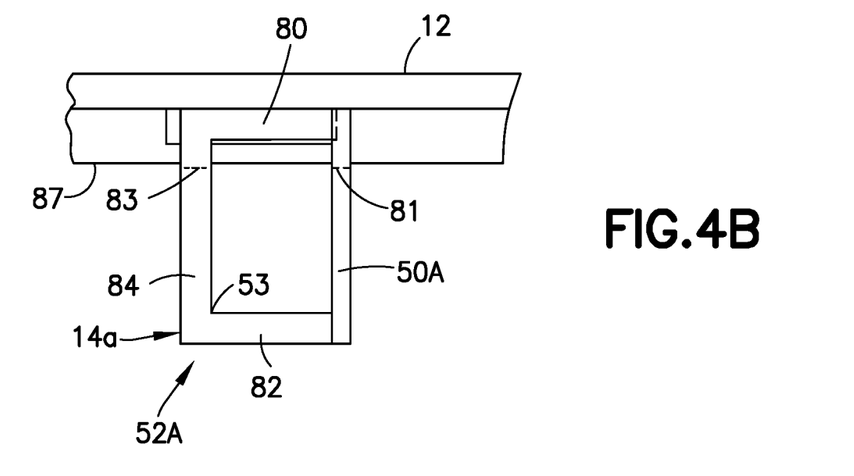

FIG. 4B shows the open cross-sectional frame 14a and riser duct closure cover 50A, but in a location where a stringer 87 intersects the open cross-sectional frame 14a. The stringer 87 has a notch where the stringer 87 goes around the first flange 80 of the open cross-sectional frame 14a. In addition, the stringer 87 passes through a frame cutout 83 (indicated by a dashed line) formed in the web 84 of the open cross-sectional frame 14a and through a riser duct cutout 81 (indicated by a dashed line) formed in the riser duct closure cover 50A. The riser duct cutout 81 in riser duct closure cover 50A enables the riser duct closure cover 50A to be nested around the stringer 87. Similar cutouts can be provided where other stringers pass through the frame 14a and the riser duct closure cover 50A.

Figure 4C:
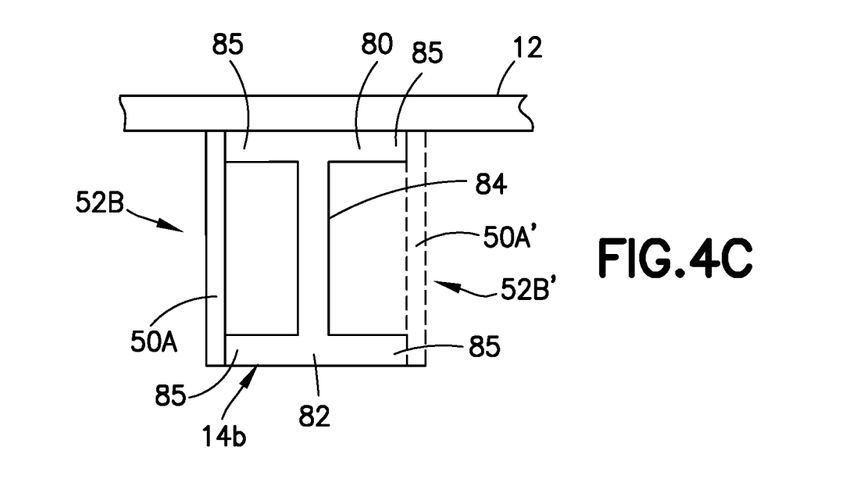

As seen in FIG. 4C, an open cross-sectional frame 14b has a an H-shaped (or I-shaped) cross-sectional profile comprising a first flange 80 attached to the fuselage skin 12, a second flange 82 extending parallel to the first flange 80, and a web 84 extending perpendicular to and connecting the midsections of the first flange 80 and second flange 82. The open cross-sectional frame 14b therefore has open areas on both sides of the web 84. The open cross-sectional frame 14b can be closed on one side by a riser duct closure cover 50A attached to left-hand distal ends 85 of the first flange 80 and second flange 82, thus forming a riser duct 52B. Optionally, the open cross-sectional frame 14b can be closed on the right side by a riser duct closure cover 50A' attached to the right-hand distal ends 85 of the first flange and second flange 82, thus forming a riser duct 52B'. The riser duct closure cover 50A and 50A' have a cross-sectional profile that is planar similar to those shown in FIGS. 4A and 4B.

Figure 4D:
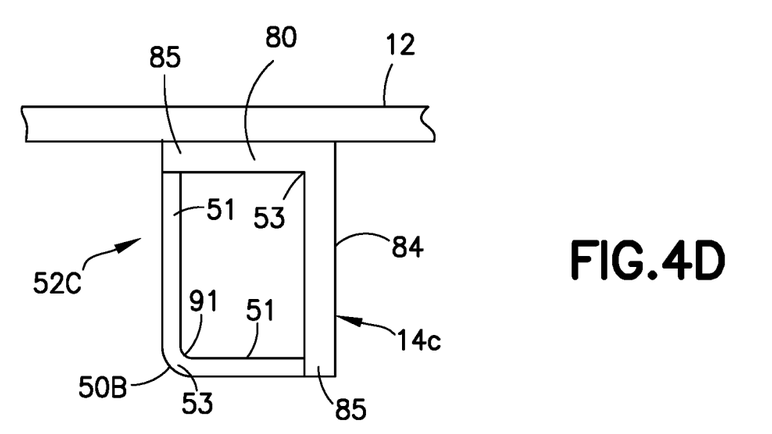

As seen in FIG. 4D, an open cross-sectional frame 14c has a cross-sectional profile comprising a first flange 80 attached to the fuselage skin 12 and a web 84 extending perpendicular from one end of first flange 80 to form a cross-sectional profile that is L-shaped. The open cross-sectional frame 14c is closed by an L-shaped riser duct closure cover 50B attached to distal ends 85 of flange 80 and web 84, thus forming a riser duct 52C. Similar to the riser duct closure covers 50A in FIGS. 4A-4C, the L-shaped riser duct closure cover 50B encloses the open space formed by the frame 14c, but is a different shape. In this case the intersection 53 of the two mutually perpendicular straight legs 51 of the L-shaped riser duct closure cover 50B has a rounded profile, which provides a smoothly curved interior surface 91 to mitigate at least one of air friction and noise as air flows through the riser duct 52C. In alternative embodiments, the profile of the riser duct closure cover 50B can be continuously curved and without any straight portions (e.g., circular, elliptical, or spline).

Figure 4E:
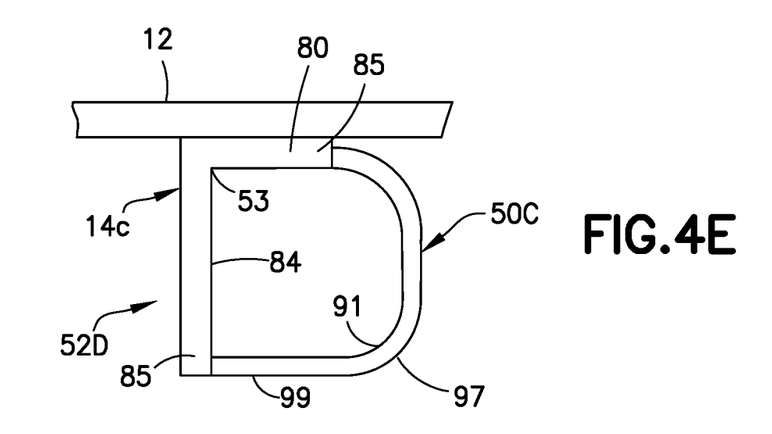

FIG. 4E shows a similar open cross-sectional frame 14c shown in FIG. 4D with an L-shaped cross-sectional profile comprising a first flange 80 attached to the fuselage skin 12 and a web 84 extending perpendicular from one end of first flange 80. The open cross-sectional frame 14c is closed by a riser duct closure cover 50C attached to the distal ends of the first flange 80 and web 84, thus forming a riser duct 52D. Similar to the riser duct closure cover 50A in FIGS. 4A-4C and the L-shaped riser duct closure cover 50B in FIG. 4D, the riser duct closure cover 50C encloses the open space formed by the frame 14c, but is a different shape. In this case, the profile in the sectional plane of the riser duct closure cover 50C includes a major curved leg 97 and a minor straight leg 99. The transition from the major curved leg 97 to the minor straight leg 99 is preferably curved and smooth. The curved portions of riser duct closure cover 50C have curved interior surfaces 91 which mitigate at least one of air friction and noise as air flows through the riser duct 52D.

Figure 4F:
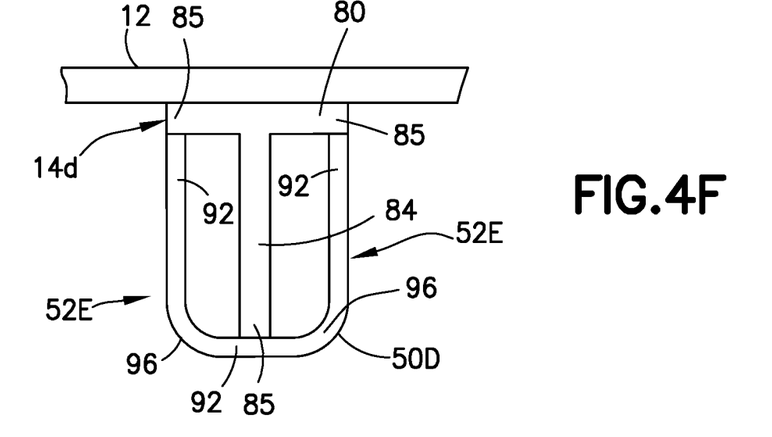

As seen in FIG. 4F, an open cross-sectional frame 14d has a T-shaped cross-sectional profile comprising a first flange 80 attached to the fuselage skin 12 and a web 84 extending perpendicular from the midsection of first flange 80. The open cross-sectional frame 14d can be closed on both sides of the web 84 by a riser duct closure cover 50D attached to distal ends 85 of first flange 80 and web 84, thus forming dual riser ducts 52E. In this example, the riser duct closure cover 50D has a U-shaped cross-sectional profile in the sectional plane comprising straight sections 92 connected by curved sections 96. In alternative configurations, the profile of riser duct closure cover 50D can be continuously and entirely curved.

Figure 4G:
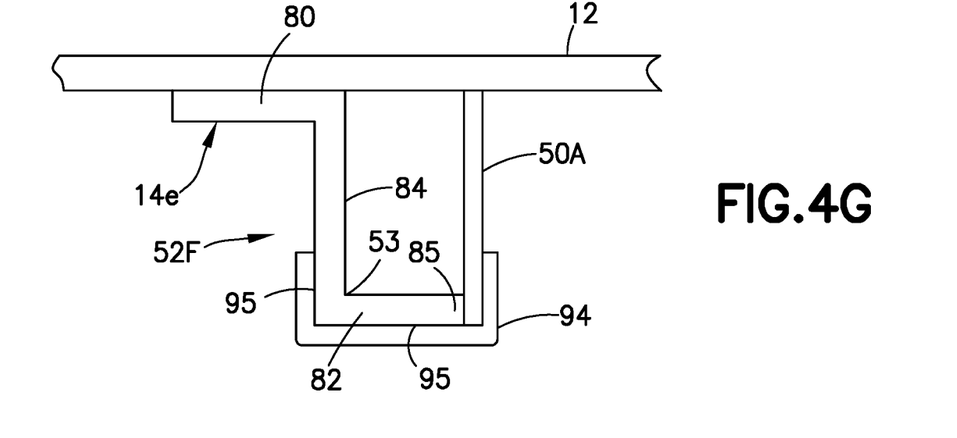

As seen in FIG. 4G, an open cross-sectional frame 14e has a cross-sectional profile comprising a first flange 80 attached to the fuselage skin 12, a web 84 extending perpendicular from one end of first flange 80, and a second flange 82 extending parallel to the first flange 80. The first flange 80 and second flange 82 extend in opposite directions from opposite ends of the web 84. The open cross-sectional frame 14e is closed on one side by a riser duct closure cover 50A (as in FIGS. 4A-4C) which is attached to the skin 12 and to the distal end 85 of second flange 82, thus forming a riser duct 52F. Thus, in this configuration, the riser duct 52F is partly defined by the frame 14e, partly defined by the skin 12, and partly defined by the riser duct closure cover 50A.

To reduce the amount of noise that the window seat passenger will be exposed to as air flows through the riser duct 52F, a layer of acoustic damping material 94 can be applied on the external surface 95 of the second flange 82, which acoustic damping material 94 can be extended to covers portions of the external surfaces 95 of the web 84 and the riser duct closure cover 50A. The acoustic damping material 94 may include elements such as damping, fiberglass blankets, acoustic foam, trim panels, isolators, and other components. As an example, damping tiles may be placed onto the riser duct 52F to absorb vibration energy. Fiberglass blankets or acoustic foam layers may be added to absorb noise that may radiate from the riser duct 52F. In an alternative embodiment, micro-perforated plates designed to absorb sound can be applied on passenger-facing surfaces of the riser duct. The acoustic damping material 94 can be coupled to any embodiment of the riser duct 52 described herein.

Figure 4H:
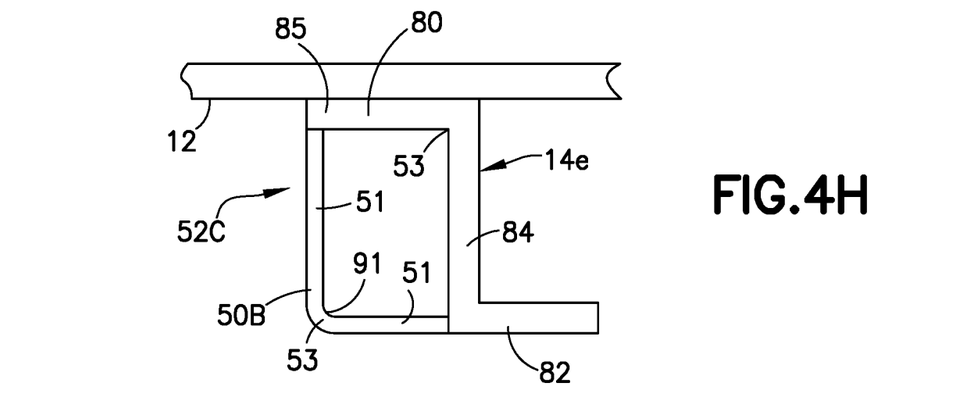

FIG. 4H shows an alternative wherein the L-shaped riser duct closure cover 50B shown in FIG. 4D is used to form a riser duct 52C with the open cross-sectional frame 14e shown in FIG. 4G. The open cross-sectional frame 14e is closed on one side by the L-shaped riser duct closure cover 50B and attached to the distal ends 85 of the first flange 80 and to the intersection 53 of the second flange 82 and web 84, thus forming riser duct 52C. In this case, the intersection 53 of the two mutually perpendicular straight legs of the L-shaped riser duct closure cover 50B has a rounded profile, which provides a smoothly curved interior surface 91 to mitigate at least one of air friction and noise as air flows through the riser duct 52C. In alternative embodiments, the profile of the riser duct closure cover 50C can be continuously curved and without any straight portions (e.g., circular, elliptical, or spline).

Figure 4I:
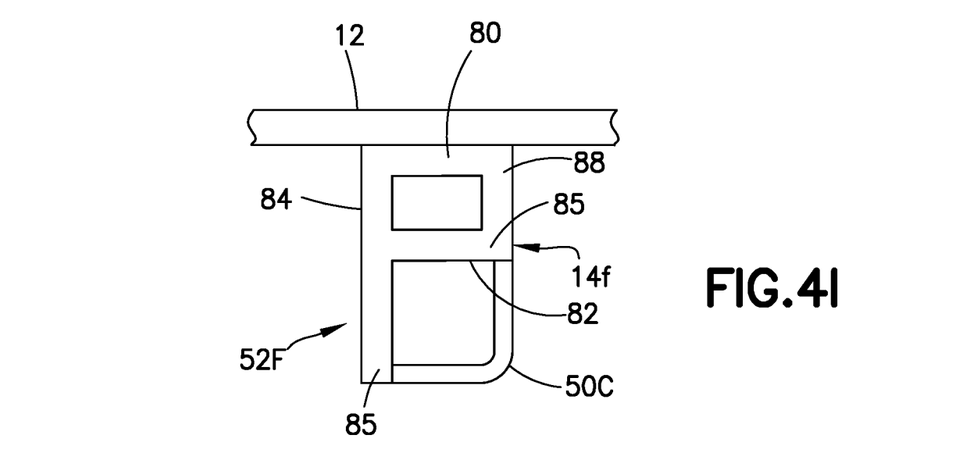

As seen in FIG. 4I, an open cross-sectional frame 14f has a cross-sectional profile in the sectional plane comprising a first flange 80 attached to the skin 12, a first web 84 extending perpendicular from one end of the first flange 80, a second web 88 extending perpendicular from the other end of the first flange 80 and parallel to the first web 84, and a second flange 82 extending parallel to the first flange 80 and connecting a distal ends 85 of the second web 88 with a midsection of the first web 84. The open cross-sectional frame 14f is closed on one side by an L-shaped riser duct closure cover 50C (similar to those shown in FIGS. 4D and 4H) attached to the distal end 85 of the first web 84 and to the intersection 53 of the second flange 82 and the second web 88, thus forming a riser duct 52F.

Figure 5:
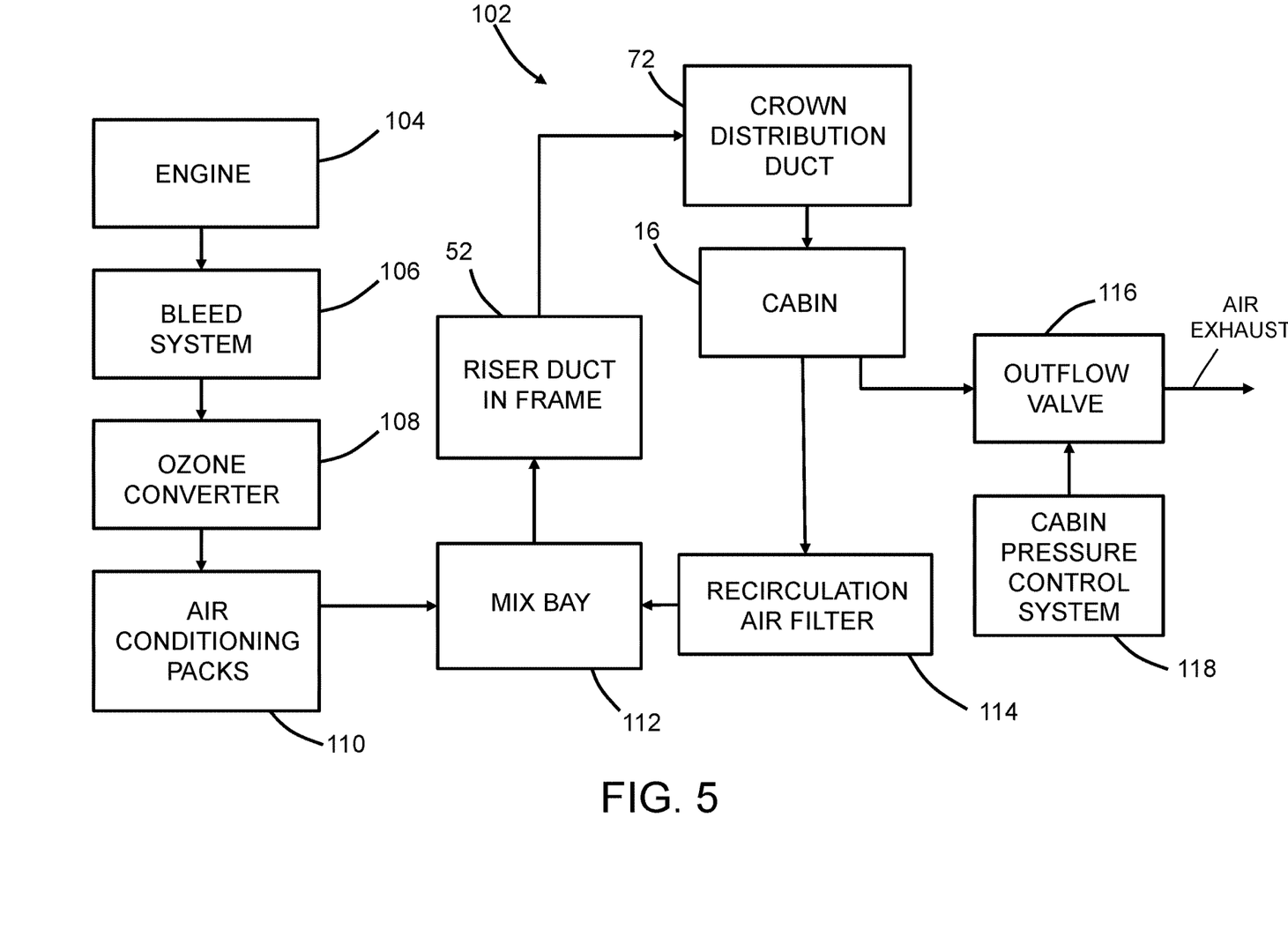
FIG. 5 is a block diagram identifying some components of an environmental control system for an aircraft.

FIG. 5 is a block diagram identifying some components of an environmental control system (ECS) 102 for an aircraft in accordance with one embodiment, which ECS 102 incorporates a riser duct 52 formed by attaching a riser duct closure cover 50 to a portion of a fuselage frame 14. The ECS 50 provides air to the cabin 16 by bleeding air from a turbofan engine 104, recirculating air from the cabin 16, and then mixing the bleed air and recirculated air in a mix manifold 112 (or mix bay). To illustrate how the ECS 102 works, a volume of air will be described as the volume of air flows from the turbofan engine 104 to the cabin 16.

A majority of the air drawn into the turbofan engine 104 passes through the bypass portion of the engine. Some of the air passing through the engine core is extracted by a bleed system 106, which comprises bleed port openings, valves, and a heat exchanger. The heat exchanger provides air at the proper temperature and pressure required by the pneumatic systems of the aircraft. The volume of air exiting the heat exchanger passes through an ozone converter 108 and to the air-conditioning packs 110. The ozone converter 108 disassociates atmospheric ozone to oxygen molecules. The air-conditioning packs 110 provide substantially dry, sterile, and dust-free conditioned air to the cabin 16 at the proper temperature, flow rate, and pressure.

The air-conditioned air then flows into the mix manifold 112 (or mix bay), where the air-conditioned air is mixed with an equal volume of filtered recirculated air from the recirculation air filter 114. The mix manifold 112 is in fluid communication with at least one riser duct 52 by way of a supply duct 70. In accordance with one embodiment, the air from the mix manifold 112 is separated into respective flows through multiple riser ducts 52, wherein each riser duct 52 is partly defined by a portion of a respective fuselage frame 14 and partly defined by a respective riser duct closure cover 50 attached to that portion of the frame 14. Each riser duct 52 channels air from below the deck 18 to the overhead cabin ventilation system above the ceiling 20 (see FIG. 1). The overhead cabin ventilation system includes a crown distribution duct 72 extending the length of cabin 16 and supplying air to each seating zone via nozzles. The air supplied by the overhead cabin ventilation system circulates in the cabin 16 while continuously mixing before the air is exhausted through return air grilles (not shown in FIG. 5) located in the sidewalls near the deck 18. Some of the returned air is supplied to the recirculation air filter 114 and the remainder of the returned air is exhausted from the aircraft by means of a cabin pressure outflow valve 116, which is under the control of a cabin pressure control system 118.

In accordance with another aspect of the disclosure, the frames 14 in proximity to window seats 38 are equipped with respective airbags. More specifically, for each pair of adjacent frames 14 in which the first frame 14 of the pair is located forward of the window seat 38, the second frame 14 of the pair is located aft of the window seat 38, and the window seat 38 projects into the inter-frame space 40 between the first and second frames 14, the first frame 14 is equipped with an airbag 56 (e.g., has an airbag module 54 mounted thereto) to mitigate concerns of a passenger seated in the window seat 38 contacting the frame 14 and satisfy Head impact criteria (HIC), which is set forth in FAR Sec. 25.562 "Emergency Landing Conditions", and other similar criteria and conditions in other regulatory jurisdictions, such as EASA in Europe. The airbag 56 will be inflated in response to detection of a condition in which there is a risk that a passenger seated behind the frame 14 may impact the frame 14. Such a condition will be referred to herein as an "impact risk condition".

In accordance with one embodiment, the airbag modules 54 are mounted to the fuselage frames 14 as shown, for example, in FIG. 1. That embodiment will now be described in some detail with reference to FIGS. 6 and 7. The airbag modules 54 can be used on frames 14 with or without the duct closure cover 50. When used with the duct closure cover 50, the airbag module(s) 54 can be mounted to the duct closure cover 50 or to the frame 14.

Figure 6:
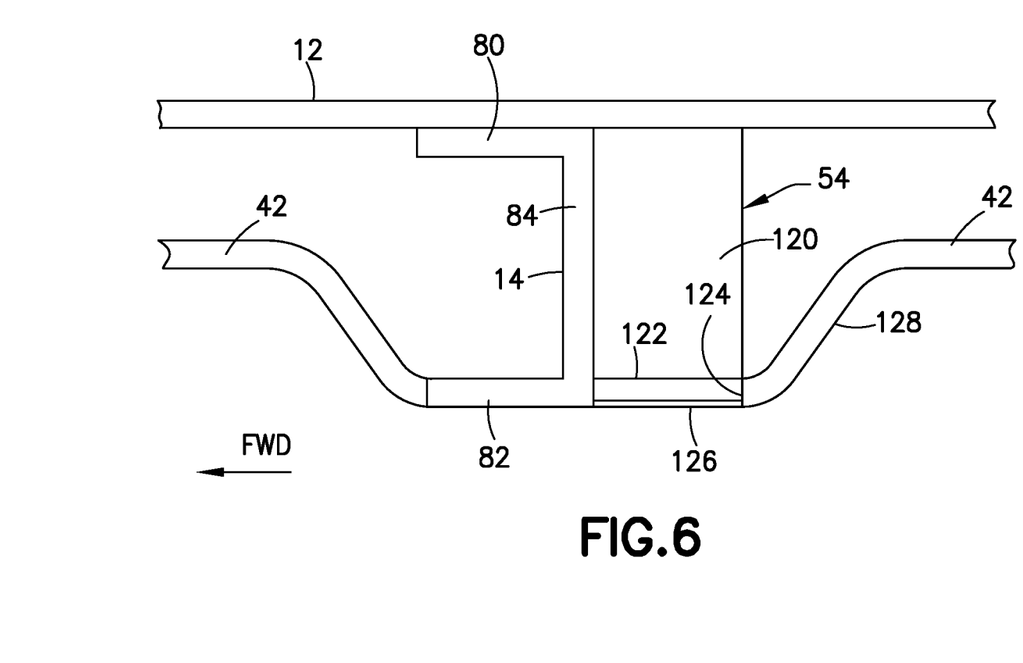
FIG. 6 is a diagram representing a sectional view of a frame having an airbag module mounted thereto in accordance with one embodiment.

FIG. 6 is a diagram representing a top cross-sectional view of a frame 14 having at least one airbag module 54 mounted thereto. The forward direction is indicated by an arrow labeled "FWD". The airbag modules 54 are located behind the frame 14, and the airbags 56 which is stowed inside the airbag modules 54 deploy with some combination of inward and/or rearward deployment. In variant embodiments, the location of the airbag modules 54 aft or forward of a frame 14 is possible, as well as deployment of the airbags 56 inward and/or rearward. The inflated shape of airbags 56 may be tailored for the airbags 56 to optimally perform their cushioning function (shape tailoring methods are known).

In the example depicted in FIG. 6, the frame 14 comprises a radially-outer curved first flange 80 and a radially-inner curved second flange 82. The first flange 80 and second flange 82 are connected by a web 84, such as an annularly-shaped web. This frame 14 is similar in shape and configuration to the frame 14a in FIGS. 4A-4B. For any given cross-sectional profile of the frame 14, the web 84 appears to be perpendicular to the first flange 80 and second flange 82. The widths of the first flange 80 and second flange 82 may be equal. The first flange 80 is joined to the fuselage skin 12, while the airbag modules 54 are mounted to the web 84. Preferably the airbag modules 54 are configured and mounted so that, upon deployment of the airbag 56, a passenger's head will be protected by the inflated airbag 56 against impact with frame 14.

The airbag modules 54 comprise a housing 120, an airbag 56 (shown in FIG. 1) in the housing 120, and a tear-away cover 122 made of rigid plastic. The tear-away cover 122 is configured to open by partially separating from the housing 120 due to pressure exerted by the inflating airbag 56. During deployment of the airbag 56, it is preferable for the tear-away cover 122 to remain partially attached to the housing 120 to prevent the tear-away cover 122 from flying loose in the cabin 16. In accordance with one implementation, the tear-away cover 122 is rectangular, and the associated concave interior side panel 42 has a rectangular cutout 124 that receives the tear-away cover 122 with a snug fit when the airbag modules 54 and the concave interior side panel 42 are fully installed. A decorative cover sheet 126 can be applied to cover the surface of the tear-away cover 122 and provide a visual appearance that matches the appearance of the concave interior side panel 42. Preferably the surface of the decorative cover sheet 126 is flush with the inboard surface 128 of the concave interior side panel 42.

Additional airbag module(s) 54 could be mounted to frame 14 to be associated with other parts of the passenger's body, such as the torso, arms, shoulders, elbows, forearms, hands, legs, knees, calves and feet. In addition, the frame 14 may have a cross-sectional profile different than the profile depicted in FIG. 6. For example, the frame 14 could be a curved beam having an I-shaped, H-shaped, T-shaped or L-shaped profile, as shown for example, in FIGS. 4A-4I.

Figure 7:
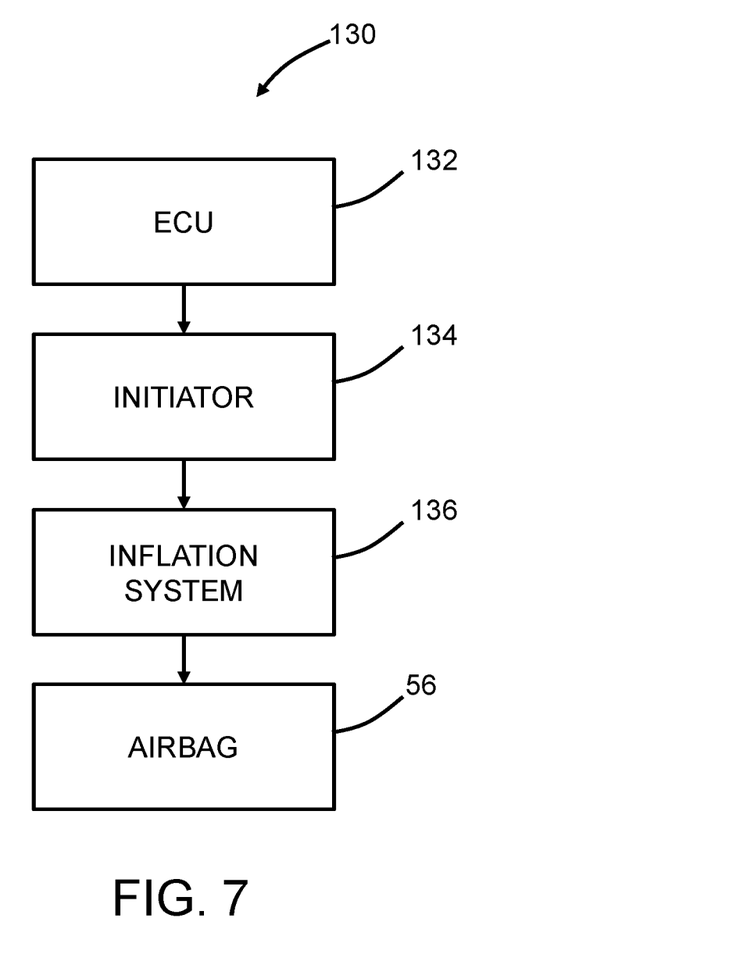
FIG. 7 is a block diagram identifying some components of an airbag system.

FIG. 7 is a block diagram identifying some components (including one or more airbag modules 54 each having an airbag 56) of an airbag system 130 in accordance with one embodiment. The airbag 56 (typically made of fabric) is housed within the airbag module 54, such as within the housing 120 of the airbag module 54, that is mounted to the frame 14, as previously described with reference to FIG. 6. The airbag 56 is operatively coupled to an electronic control unit (ECU) 132 onboard the aircraft that triggers the initiation of airbags 56 when certain criteria are met. The ECU 132 comprises a plurality of sensors (including, e.g., MEMS accelerometers and seat occupancy sensors) that continuously monitor the acceleration and deceleration of the aircraft. The ECU 132 further comprises a processor that processes the sensor data using an algorithm to determine if a deceleration experienced by the aircraft meets a condition for deploying the airbag 56, such as one or more of the following exceeding a threshold: acceleration, angular rate, angular acceleration and jerk (time derivative of acceleration). The algorithm incorporates HIC.

When the processor of the ECU 132 determines, based on a set of predetermined criteria, that the aircraft is in an impact risk condition, the ECU 132 outputs an electrical signal to an initiator 134. The initiator 134 is in turn operatively coupled to an inflation system 136 that is, in turn, operatively coupled to the airbag 56. The initiator 134 activates the inflation system 136. The inflation system 136 may comprise a gas generator that uses a compressed or liquefied gas or mixture of gases to rapidly generate a large volume of inflation gas. This inflation gas is then channeled through tubing to the airbag 56. The gas inflates the airbag 56, allowing the airbag 56 to absorb any impact of an object moving toward a fuselage frame 14 as the aircraft changes course in a way that meets condition(s) for deployment. One, some or all airbags 56 may be deployed by the ECU in response to an impact risk condition, for example, only the airbags on the right side or the left side of the aircraft may be deployed.

The detection of an impact risk condition is made by the ECU 132, which is programmed to process sensor data and execute an impact risk condition detection algorithm. Sensors used to detect such conditions might include sensors that measure or compute acceleration, angular rate, angular acceleration, and/or jerk, in any direction or combination of directions.

While the specification refers to aircraft having a "reduced fuselage perimeter," much of the detailed description focuses on fuselage width for ease of description because fuselage width correlates to fuselage perimeter. Accordingly, a reduction in fuselage width allows a reduction in fuselage perimeter, with or without corresponding reduction in fuselage height. Further, as used in the claims, the term "frame" should be construed broadly to encompass both monolithic hoop-shaped frames and frames comprising two or more arc-shaped frame sections joined end to end.

While fuselage configurations and cabin layouts have been described with reference to various embodiments, various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. An aircraft comprising:
   a multiplicity of frames spaced apart along a longitudinal axis with inter-frame spaces between adjacent frames of the multiplicity of frames;
   a deck that spans the interior volume of and is supported by the multiplicity of frames;
   a ceiling depending from the multiplicity of frames and disposed above the deck; and
   a riser duct closure cover attached to a portion of a frame of the multiplicity of frames to define a riser duct.

2. The aircraft as recited in claim 1, further comprising a supply duct located below the deck and a crown distribution duct located above the ceiling, the crown distribution duct being in fluid communication with the supply duct by way of the riser duct.

3. The aircraft as recited in claim 2, further comprising a feed-out tube, wherein the crown distribution duct is in fluid communication with the riser duct by way of the feed-out tube.

4. The aircraft as recited in claim 2, further comprising a feed-in tube, wherein the supply duct is in fluid communication with the riser duct by way of the feed-in tube.

5. The aircraft as recited in claim 1, wherein the riser duct has a cross-sectional profile comprising at least one curved section to mitigate at least one of air friction and noise due to air flow through the riser duct.

6. The aircraft as recited in claim 1, further comprising means for reducing noise which cover at least a portion of a surface of the riser duct, wherein the surface of the riser duct which is covered by the means for reducing noise faces inboard.

7. The aircraft as recited in claim 1, wherein the frame to which the riser duct closure cover is attached comprises first and second flanges and a web connected to the first and second flanges, the riser duct closure cover being attached to the first and second flanges.

8. The aircraft as recited in claim 7, wherein the frame has a cross-sectional profile that is channel-shaped and the riser duct closure cover has a cross-sectional profile that is planar.

9. The aircraft as recited in claim 7, wherein the frame has a cross-sectional profile that is H-shaped and the riser duct closure cover has a cross-sectional profile that is planar.

10. The aircraft as recited in claim 1, wherein the frame to which the riser duct closure cover is attached comprises a flange and a web connected to the flange, the riser duct closure cover being attached to the web and the flange.

11. The aircraft as recited in claim 10, wherein the flange and web of the frame have a cross-sectional profile that is L-shaped and the riser duct closure cover has a cross-sectional profile that is L-shaped.

12. The aircraft as recited in claim 10, wherein the frame has a cross-sectional profile that is T-shaped and the riser duct closure cover has a cross-sectional profile that is U-shaped.

13. The aircraft as recited in claim 10, wherein the flange comprises two distal ends and the riser duct closure cover is attached to the two distal ends of the flange.

14. The aircraft as recited in claim 1, wherein the riser duct closure cover has a shape of a section of an annular ring.

15. The aircraft as recited in claim 1, further comprising an airbag system comprising an airbag module mounted to a portion of the frame that the riser duct closure cover is attached to, wherein the airbag module comprises an airbag in a deflated state.

16. The aircraft as recited in claim 15, wherein the airbag module further comprises a housing and a tear-away cover attached to the housing, the airbag in the deflated state being housed inside the housing with the tear-away cover in place.

17. The aircraft as recited in claim 12, further comprising a decorative cover sheet that covers the tear-away cover.

18. A riser duct for use in an aircraft having a fuselage comprising a multiplicity of frames spaced apart along a longitudinal axis of the fuselage with inter-frame spaces between adjacent frames of the multiplicity of frames and a skin supported by the multiplicity of frames and bounding an interior volume of the fuselage; a deck that spans the interior volume of and is supported by the fuselage; and a ceiling depending from the fuselage and disposed above the deck, the riser duct comprising:
   a riser duct closure cover attached to a portion of a frame of the multiplicity of frames from an elevation lower than the deck to an elevation higher than the ceiling to define the riser duct.

19. A method for supplying air to a passenger cabin of an aircraft, comprising passing a volume of air through a riser duct defined by a portion of a frame of a fuselage of the aircraft and a riser duct closure cover.

20. The method as recited in claim 19, further comprising passing the volume of air in sequence through a supply duct located below a floor of the passenger cabin, through the riser duct, and then through a crown distribution duct located above a ceiling of the passenger cabin.

\* \* \* \* \*